No. 655,570. Patented Aug. 7, 1900.
D. O. McAULIFF & W. A. B. HICKS.
HANDLE BAR FOR BICYCLES.
(Application filed Jan. 27, 1899.)
(No Model.)
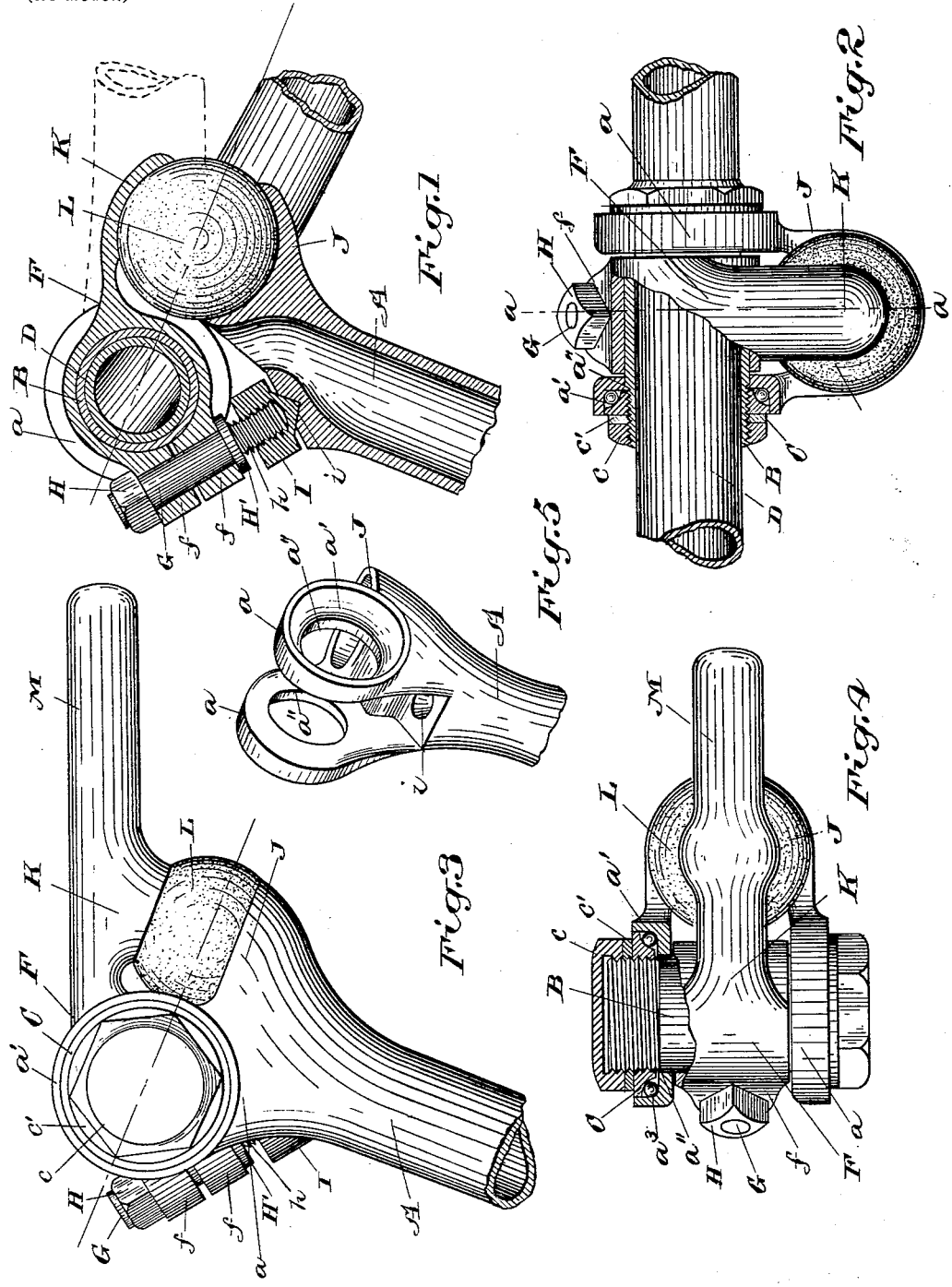
Witnesses
G. G. Snyder
E. L. Cousins
Inventors
D. O. McAuliff
W. A. B. Hicks

UNITED STATES PATENT OFFICE.

DANIEL O. McAULIFF AND WILLIAM A. B. HICKS, OF TORONTO, CANADA.

HANDLE-BAR FOR BICYCLES.

SPECIFICATION forming part of Letters Patent No. 655,570, dated August 7, 1900.

Application filed January 27, 1899. Serial No. 703,638. (No model.)

*To all whom it may concern:*

Be it known that we, DANIEL O. MCAULIFF and WILLIAM A. B. HICKS, residing in the city of Toronto, in the county of York and Province of Ontario, Canada, have invented certain new and useful Improvements in Bicycles and Like Vehicles; and we hereby declare that the following is a full, clear, and exact description of the same.

This invention relates to certain new and useful improvements in bicycles and like vehicles, and it relates more particularly to the peculiar construction and arrangement of the posts for the handle-bars and the seat or saddle.

During the progress of a foot-propelled vehicle over a rough or uneven surface a vibration or vibratory motion is developed and communicated through the saddle and handle-bars to the rider, causing the rider unnecessary and comparatively-great discomfort. To relieve the saddle and handle-bars of this vibration is the object of the present invention; and it consists, essentially, of the device hereinafter more fully set forth and more particularly pointed out in the claim.

In the drawings, Figure 1 is a transverse section of the post for the handle-bar of a bicycle, taken on the lines $a\ a$, Fig. 2. Fig. 2 is a plan view of the top of the handle-bar post partly in section and showing a portion of the handle-bar. Fig. 3 is a side elevation of the seat-post. Fig. 4 is a plan view of the top of the seat-post, partly in section. Fig. 5 is a perspective view of the top of the post for the handle-bars or seat.

Like letters of reference refer to like parts throughout the specification and drawings.

A represents the shank or stem of the post for the handle-bars or seat, the lower end of which is adapted to fit, respectively, the head of the bicycle or the standard of the frame. The top of the stem A is bifurcated to provide two forks $a\ a$, each of which is provided with an ordinary ball-cup $a'$. Passing through the bore $a''$ of the ball-cups $a'$ is a horizontal sleeve B, the ends of which are screw-threaded and project beyond the ball-cups $a'$. Fitted on the screw-thread parts of the sleeve B are adjusting-cones C, one opposed to each of the ball-cups $a'\ a'$. Interposed between the adjusting-cones and ball-cups are antifriction-balls $a^3$, and holding the cones in their adjusted positions are lock-nuts and washers $c\ c'$, respectively.

Encircling the sleeve B, between the forks $a\ a$, is an ordinary clamp F, substantially equal in length to the distance between the forks $a\ a$, in order that there will be practically no lateral movement of the clamp when assembled in position, there being sufficient clearance only to allow of freedom of movement and having a circular bore equal to the outer diameter of the sleeve.

Passing through the divided ends $f$ of the clamp F is a clamping-bolt G, fitted with a tightening-nut H on its top or outer end and on its inner end with a collar H′, bearing against the under side of the clamp. The bolt G projects beyond the collar H′, and the projecting part $h$ is screw-threaded to receive an adjusting-nut I.

The under face of the adjusting-nut I is substantially cone-shaped, and formed in the shank A adjacent to the adjusting-nut I is a correspondingly-shaped seat $i$.

The shank A is provided with a cup-shaped enlargement J on the opposite side of the forks to the adjusting-nut I.

Projecting from the clamp F over the enlargement J is a lug K, the under face of which is curved to correspond to the curvature of the enlargement J.

Contained in the cup-shaped enlargement J is a cushion L, of rubber or other elastic substance, and bearing on the top of the cushion L is the lug K. By means of the nut I the pressure of the lug K on the cushion L can be increased or diminished, respectively, to decrease or increase the elasticity of the cushion.

As shown in Figs. 1 and 2 of the drawings, the sleeve B contains the middle part of the handle-bar D, which is brazed or otherwise secured to the sleeve in order that the sleeve and handle-bar will move unitedly.

In Figs. 3 and 4 the lug K is shown to terminate in an arm M to receive the clamp of the seat or saddle.

The use of the invention is as follows: When the parts are assembled in position, the clamp F is caused by means of the clamping-bolt G to tightly grip the sleeve B to cause the united movement of the clamp and sleeve.

The adjusting-nut is turned to cause the lug K to place a pressure on the cushion L and regulate the elasticity of the cushion to the required degree. The clamp F by fitting snugly into the space between the forks *a a* is prevented from moving laterally, while the sleeve, when the cones are properly adjusted, prevents the lateral movement of the sleeve and the radial or outward movement of the clamp. The cushion L and adjusting-nut I prevent the revoluble movement of the sleeve, allowing the clamp and sleeve and handle-bar only a limited oscillatory movement equal to the compression of the cushion. When the vehicle is traveling over a rough and uneven surface, the vibratory motion created during the progress of the vehicle is compensated for by the oscillation of the clamp and sleeve and the cushioning of the jar caused by such vibration.

By means of this construction the rider is practically relieved of all vibrating sensations and all the discomfort resulting therefrom.

The adjusting-nut I, in addition to regulating the elasticity of the cushion L, forms a rigid brace for the clamp when an upward pressure is applied to the handle-bars, as when riding an upgrade. We do not confine ourselves to any particular substance for the cushion, as we may use any material for that purpose which has the requisite amount of elasticity, nor do we confine ourselves to any particular shape or size of the parts.

By means of the clamp the complete revolubility of the handle-bars is provided for, and by loosening the clamping-bolt the handle-bars can be adjusted to any position and securely held in that position by tightening the clamp upon the sleeve. By providing the sleeve and forked ends of the post with the ball-bearings the movement of the sleeve is practically frictionless and the easy operation of the parts is assured.

By providing the post with the elastic cushion the vibrations of the vehicle are transmitted to the cushion instead of to the rider and by providing the clamp with the adjusting-nut the elasticity of the cushion can be regulated.

It may be possible to use the sleeve without the ball-bearings; but it is preferable to make use of the ball-bearings, as they reduce the friction.

Having fully described our invention, what we claim as new, and desire to secure by Letters Patent, is—

A post for the handle-bars or saddle of a foot-propelled vehicle consisting of a shank having a bifurcated end, fitted with a horizontal bore a bar passing through the bore, a clamp contained between the bifurcated ends embracing the bar, a clamping-bolt for the clamp, an adjusting-nut fitted on the clamping-bolt and bearing against the stem, a cup fitted to the stem, a cushion or a buffer contained in the cup, and a lug projecting from the clamp bearing on the top of the cushion, substantially as specified.

Toronto, Canada, January 14, A. D. 1899.

D. O. McAULIFF.
W. A. B. HICKS.

In presence of—
THEODORE A. HUNT,
C. H. RICHES.